United States Patent
Hong et al.

(10) Patent No.: US 11,208,012 B2
(45) Date of Patent: *Dec. 28, 2021

(54) SWIVEL DEVICE OF SEAT FOR VEHICLES

(71) Applicants: HYUNDAI MOTOR COMPANY, Seoul (KR); KIA MOTORS CORPORATION, Seoul (KR)

(72) Inventors: Suk Won Hong, Bucheon-si (KR); Sang Do Park, Yongin-si (KR); Sang Hwi Yoon, Incheon (KR); So Young Yoo, Suwon-si (KR); Chan Ho Jung, Gunpo-si (KR); Jong Seok Han, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/902,519

(22) Filed: Jun. 16, 2020

(65) Prior Publication Data

US 2021/0221260 A1   Jul. 22, 2021

(30) Foreign Application Priority Data

Jan. 22, 2020   (KR) .................. 10-2020-0008237

(51) Int. Cl.
  *B60N 2/14*   (2006.01)
  *B60N 2/02*   (2006.01)
  *B60N 2/16*   (2006.01)

(52) U.S. Cl.
  CPC ............ *B60N 2/14* (2013.01); *B60N 2/0232* (2013.01); *B60N 2/1635* (2013.01); *B60N 2/1685* (2013.01); *B60N 2002/022* (2013.01); *B60N 2002/024* (2013.01)

(58) Field of Classification Search
  CPC ...... B60N 2/14; B60N 2/0232; B60N 2/1635; B60N 2/1685; B60N 2002/022; B60N 2002/024
  See application file for complete search history.

(56) References Cited

U.S. PATENT DOCUMENTS

| | | | |
|---|---|---|---|
| 8,593,097 B2 * | 11/2013 | Diehl ................... | B60N 2/0232 318/461 |
| 8,936,295 B2 * | 1/2015 | Slungare ................ | B60N 2/245 296/65.12 |
| 9,415,702 B2 * | 8/2016 | Auger .................... | B60N 2/245 |

(Continued)

*Primary Examiner* — Philip F Gabler
(74) *Attorney, Agent, or Firm* — Lempia Summerfield Katz LLC

(57) ABSTRACT

A swivel device for vehicle seats may rotate a seat mounted inside a vehicle at 180° or more and firmly fix the seat at a normal position before and after rotation. The swivel device includes: a base plate provided with a plurality of first locking members; a swivel plate disposed on the base plate to be rotated by a second motor; a rotary force transmission mechanism mounted on an output shaft of the second motor and the swivel plate to transmit a rotary force of the second motor to the swivel plate; an elevating plate provided with a plurality of second locking members separably coupled to the plurality of first locking members and formed on a lower surface of the elevating plate; and a first motor mounted on an upper surface of the elevating plate to transmit a rotary force to the lead screw.

10 Claims, 11 Drawing Sheets

(56) References Cited

U.S. PATENT DOCUMENTS

| | | | |
|---|---|---|---|
| 10,336,216 B2* | 7/2019 | Slungare | B60N 2/06 |
| 10,773,610 B2* | 9/2020 | Kim | B60N 2/34 |
| 11,001,169 B2* | 5/2021 | Jang | B60N 2/0232 |
| 2008/0048472 A1* | 2/2008 | Kuenzel | B60N 2/0232 |
| | | | 297/184.15 |
| 2017/0050538 A1* | 2/2017 | Akimoto | B60N 2/20 |

* cited by examiner

SWIVEL DEVICE OF SEAT FOR VEHICLES

CROSS-REFERENCE TO RELATED APPLICATION

This application claims priority to and the benefit of Korean Patent Application No. 10-2020-0008237, filed on Jan. 22, 2020, the entire contents of which are incorporated herein by reference.

FIELD

The present disclosure relates to a swivel device for vehicle seats. More particularly, it relates to a three-dimensional swivel device for vehicle seats which may rotate a seat mounted inside a vehicle.

BACKGROUND

The statements in this section merely provide background information related to the present disclosure and may not constitute prior art.

In preparation for launching of autonomous vehicles, seats, to which various mechanisms for conversation and conferencing among passengers, relaxation, sleeping, assistance in getting in and out, etc. are applied, are being researched and developed.

In particular, a swivel-type (rotation-type) seat which may be rotated at 180° or more in a desired direction for the purpose of multilateral conversation and conferencing, sight-seeing of an outdoor landscape, assistance in getting in and out, etc. is being developed.

We have discovered that the conventional swivel-type seat usually employs a swivel mechanism which may rotate the seat about an H-axis (a height axis of a vehicle) or a swivel mechanism using a circular rail, but rigidity of the center of rotation of the swivel-type seat is poor and thus the swivel-type seat may be damaged at the time of a collision accident.

That is to say, since the conventional swivel-type seat is rotated in a two-dimensional plane by the swivel mechanism without separate reinforcement of the center of rotation thereof, rigidity of the center of rotation of the swivel-type seat is poor and thus the swivel-type seat may be damaged at the time of a collision accident, and consequently, the swivel-type seat falls to one side and thereby increases the severity in passenger injury.

The above information disclosed in this Background section is only for enhancement of understanding of the background of the present disclosure and therefore it may contain information that does not form the prior art that is already known to a person of ordinary skill in the art.

SUMMARY

The present disclosure provides a swivel device for vehicle seats which may raise a seat upwards and then rotate the seat at 180° or more, and, after rotation, may lower the seat to an original position thereof and then firmly lock and fix the seat, so as to facilitate rotation of the seat and firmly fix the seat after rotation.

In one aspect of the present disclosure, a swivel device for vehicle seats includes: a base plate provided with a plurality of first locking members formed on an upper surface thereof, and mounted on seat rails mounted on a floor panel; a second motor mounted on a lower surface of the base plate; a swivel plate disposed on the base plate so as to be rotatable by driving of the second motor; a rotary force transmission mechanism mounted on an output shaft of the second motor and the swivel plate so as to transmit rotary force of the second motor to the swivel plate; an elevating plate provided with a plurality of second locking members separably coupled to the plurality of first locking members and formed on a lower surface of the elevating plate, wherein an internal screw hole is formed through a center of the elevating plate, and the elevating plate is fixedly mounted on a seat cushion frame and simultaneously coupled to the swivel plate so as to be raised or lowered and rotated; a lead screw inserted into the internal screw hole so as to be rotatable in place; and a first motor mounted on an upper surface of the elevating plate so as to transmit a rotary force to the lead screw.

In one form, first locking members of the plurality of first locking members have a circular pin shape and protrude upwards from the upper surface of the base plate, and second locking members of the plurality of second locking members have a cylindrical shape with a hollow formed therein and protrude downwards from the lower surface of the elevating plate, so that the first locking members are inserted into the corresponding second locking members of the plurality of second locking members.

In another form, the first locking members may be disposed on the upper surface of the base plate at predetermined intervals in a circumferential direction, and the second locking members may be disposed on the lower surface of the elevating plate at predetermined intervals in the circumferential direction.

In still another form, a pivot cover having a pivot shaft may be mounted at a center of the base plate, and a pivot recess into which the pivot shaft of the pivot cover is inserted may be formed in a center of a lower surface of the swivel plate.

In yet another form, the rotary force transmission mechanism may include: a driving gear mounted on the output shaft of the second motor configured to pass through a through hole formed through the base plate, and a driven gear formed on a lower surface of the swivel plate so as to be engaged with the driving gear.

In still yet another form, an arc-shaped slot configured to receive a rotation shaft of the driving gear may be formed through an edge portion of the swivel plate.

In some forms of the present disclosure, a gear cover having a diameter greater than a width of the arc-shaped slot may be adhered to the rotation shaft of the driving gear inserted into the arc-shaped slot so as to prevent separation of the driving gear.

In some forms of the present disclosure, two or more guide pins may protrude upwards from an upper surface of the swivel plate, and guide holes configured to receive the guide pins may be formed through the elevating plate.

In some forms of the present disclosure, mount terminals mounted on movable rails of the seat rails may protrude from both side portions of the base plate.

In some forms of the present disclosure, mount plates mounted on the seat cushion frame may protrude from both side portions of the elevating plate.

Other aspects and forms of the present disclosure are discussed infra.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 12A:
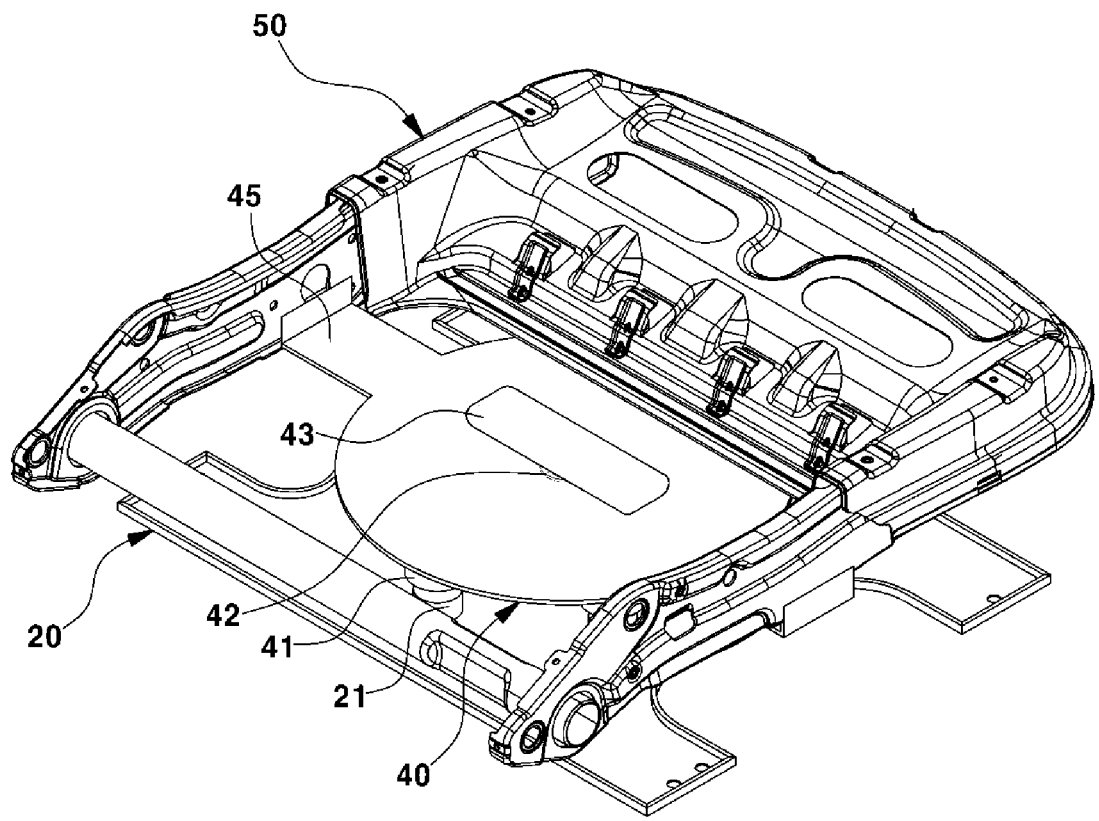
Figure 12B:
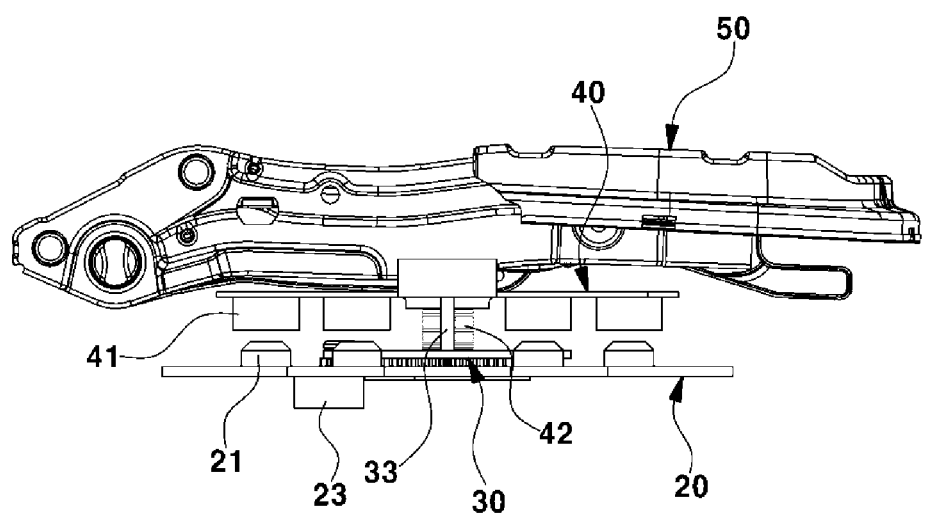
Figure 13A:
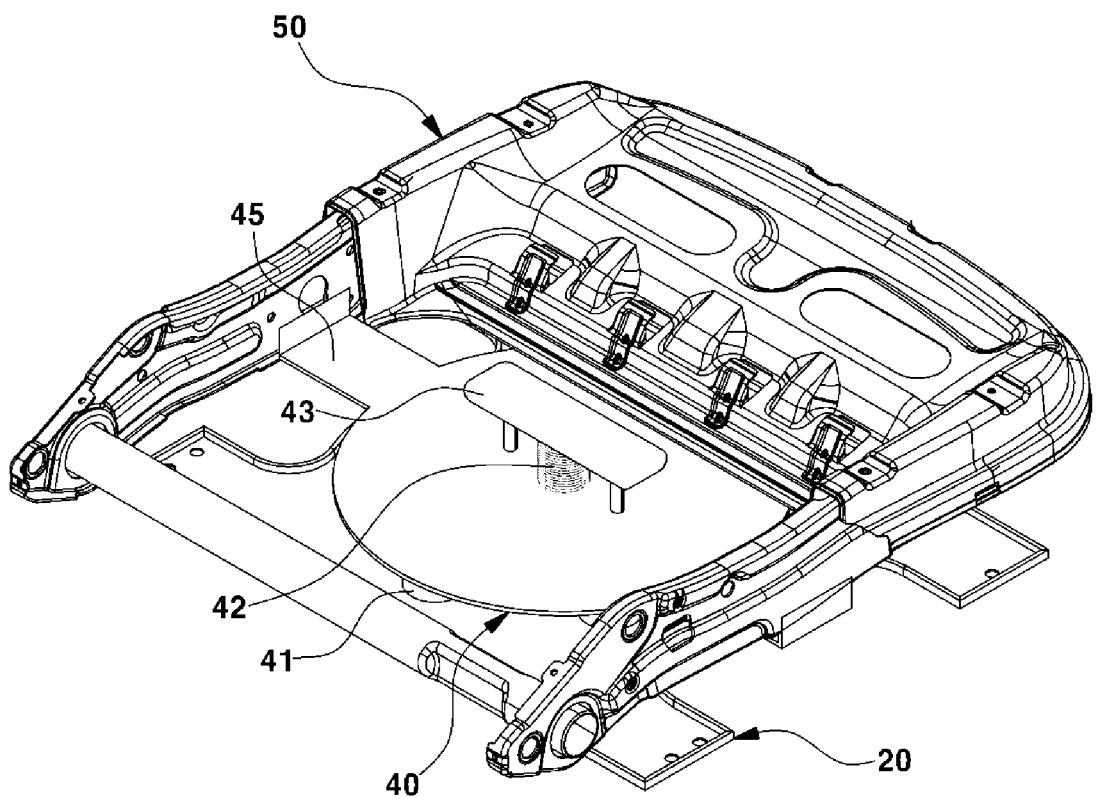
Figure 13B:
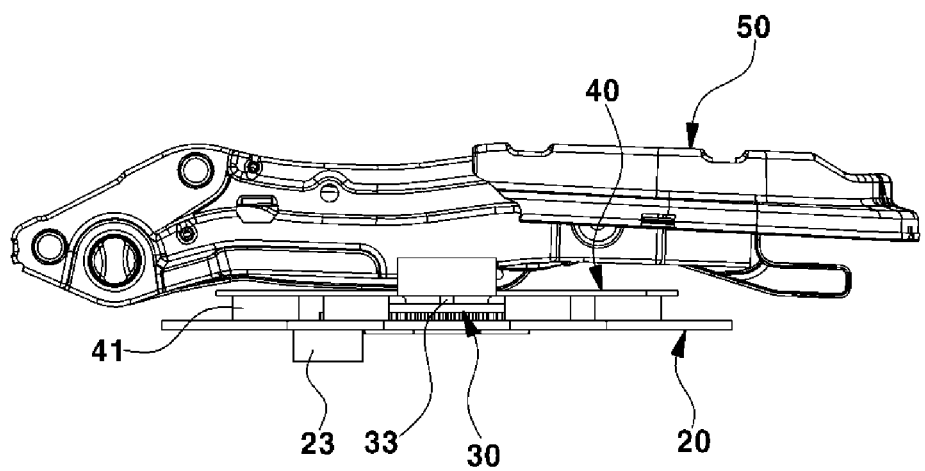

FIGS. 12A and 12B are perspective and side views illustrating the swiveling-completed state of the swivel device for vehicle seats according to one form of the present disclosure; and FIGS. 13A and 13B are perspective and side views illustrating the lowered state of the elevating plate after swiveling of the swivel device for vehicle seats according to one form of the present disclosure has been completed.

It should be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes, will be determined in part by the particular intended application and use environment.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter reference will be made in detail to various forms of the present disclosure, examples of which are illustrated in the accompanying drawings and described below. While the present disclosure will be described in conjunction with exemplary forms, it will be understood that the present description is not intended to limit the present disclosure to the exemplary forms. On the contrary, the present disclosure is intended to cover not only the exemplary forms, but also various alternatives, modifications, equivalents and other forms within the spirit and scope of the present disclosure as defined by the appended claims.

Figure 1:
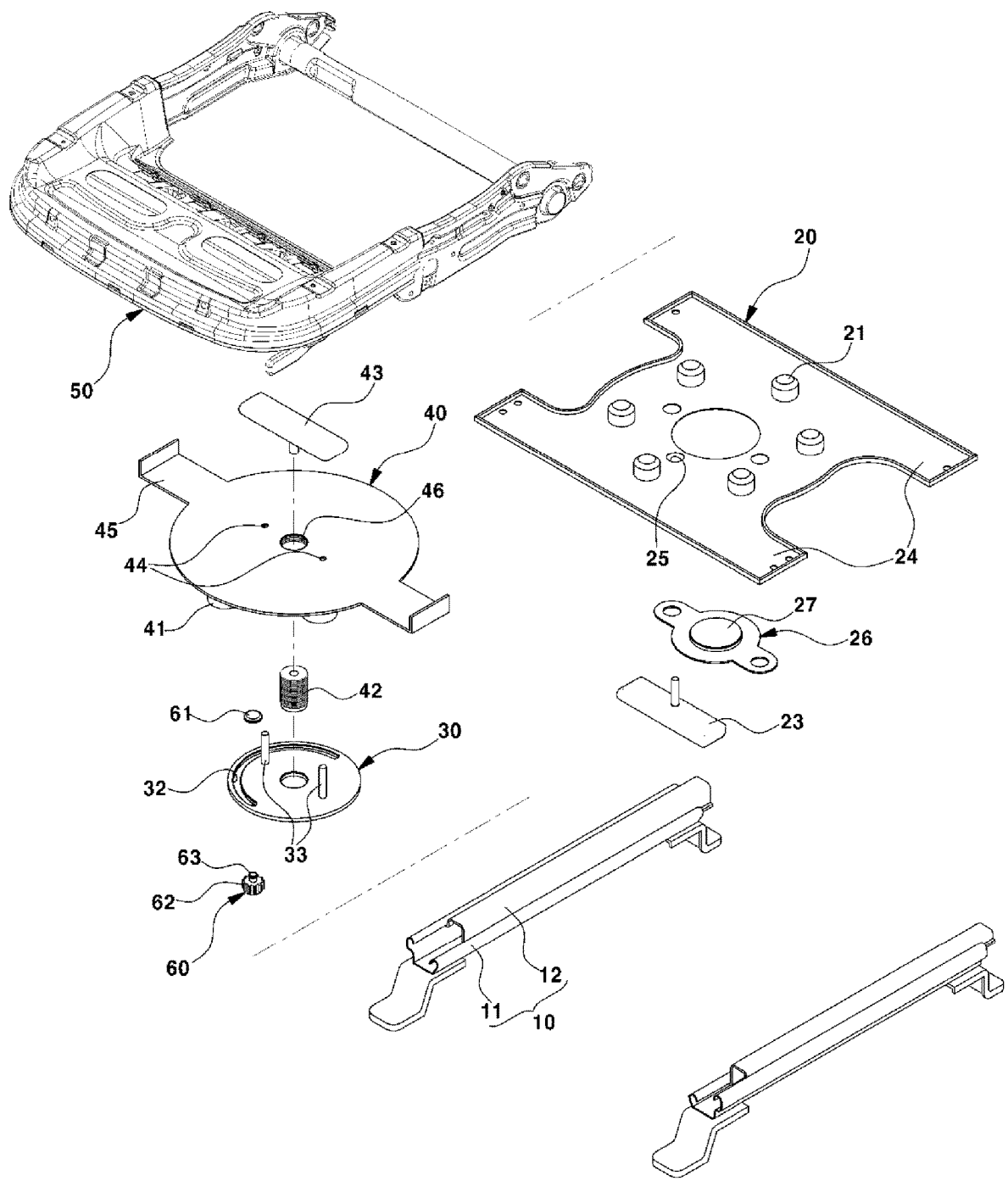
FIG. 1 is an exploded perspective view illustrating a swivel device for vehicle seats according to one form of the present disclosure.
Figure 2:
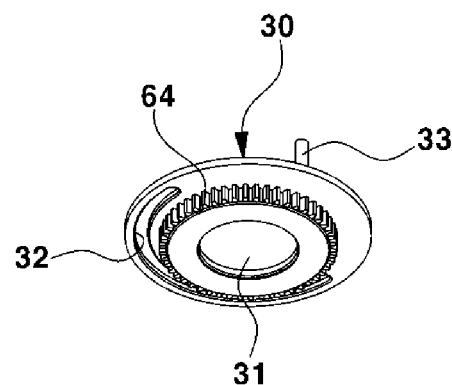
FIG. 2 is a perspective view illustrating the lower portion of a swivel plate of the swivel device for vehicle seats according to one form of the present disclosure.
Figure 3:
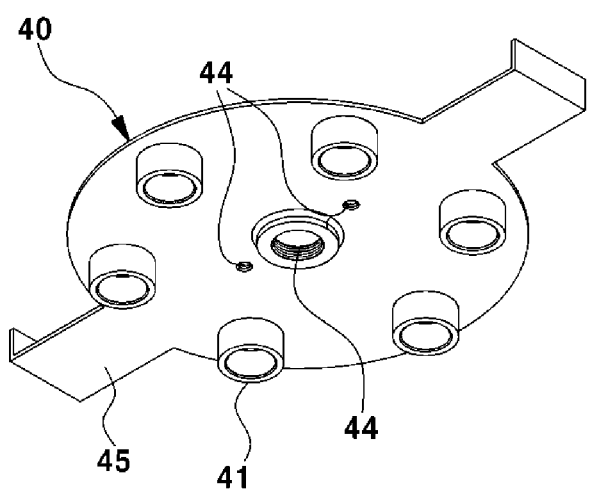
FIG. 3 is a perspective view illustrating the lower portion of an elevating plate of the swivel device for vehicle seats according to one form of the present disclosure.
Figure 4:
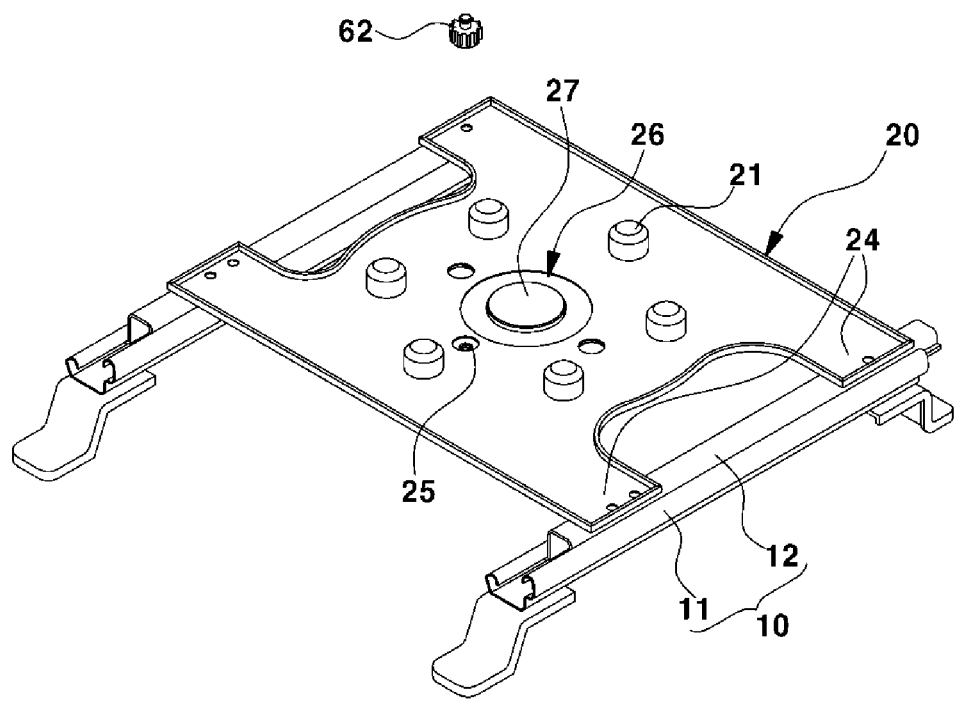
FIGS. 4 to 6 are perspective views respectively illustrating an assembly of the swivel device for vehicle seats according to one form of the present disclosure.
Figure 5:
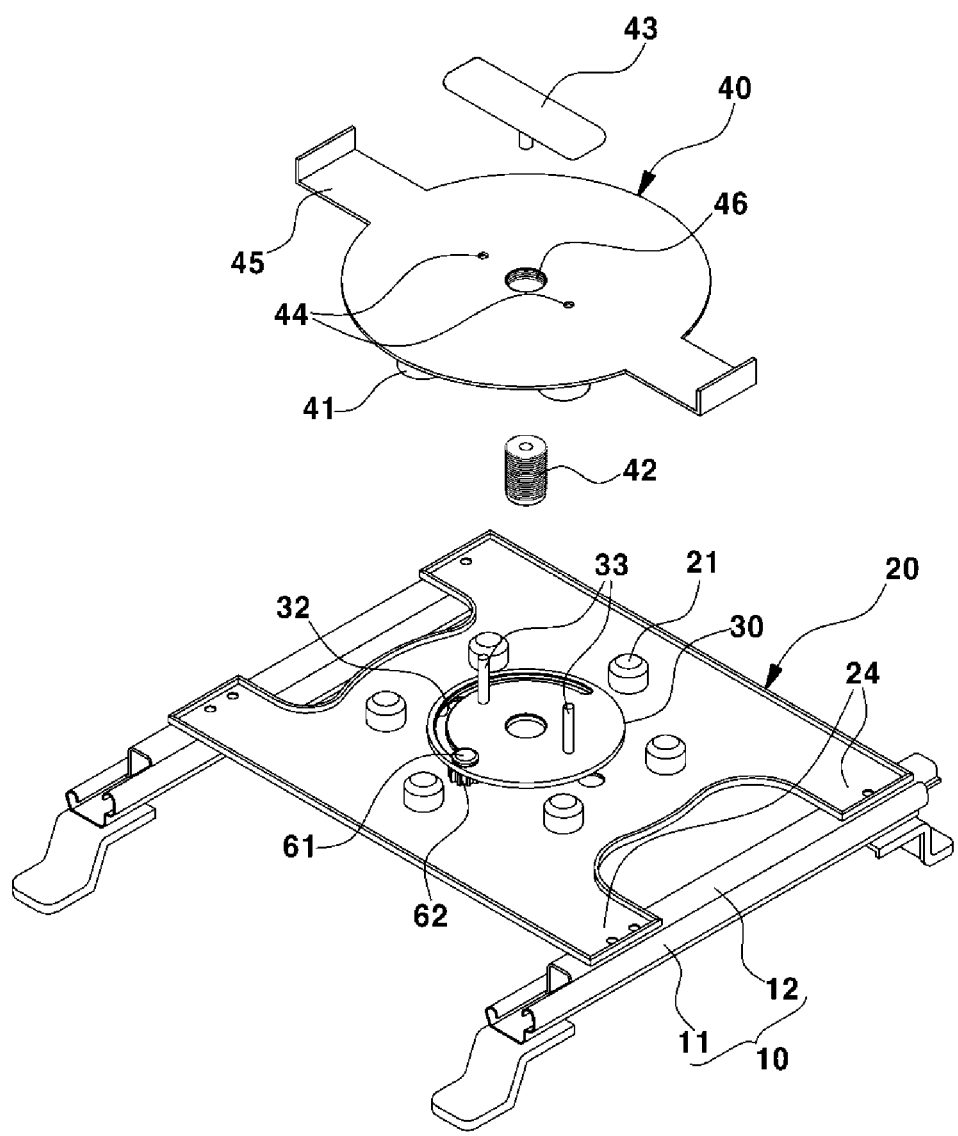
Figure 6:
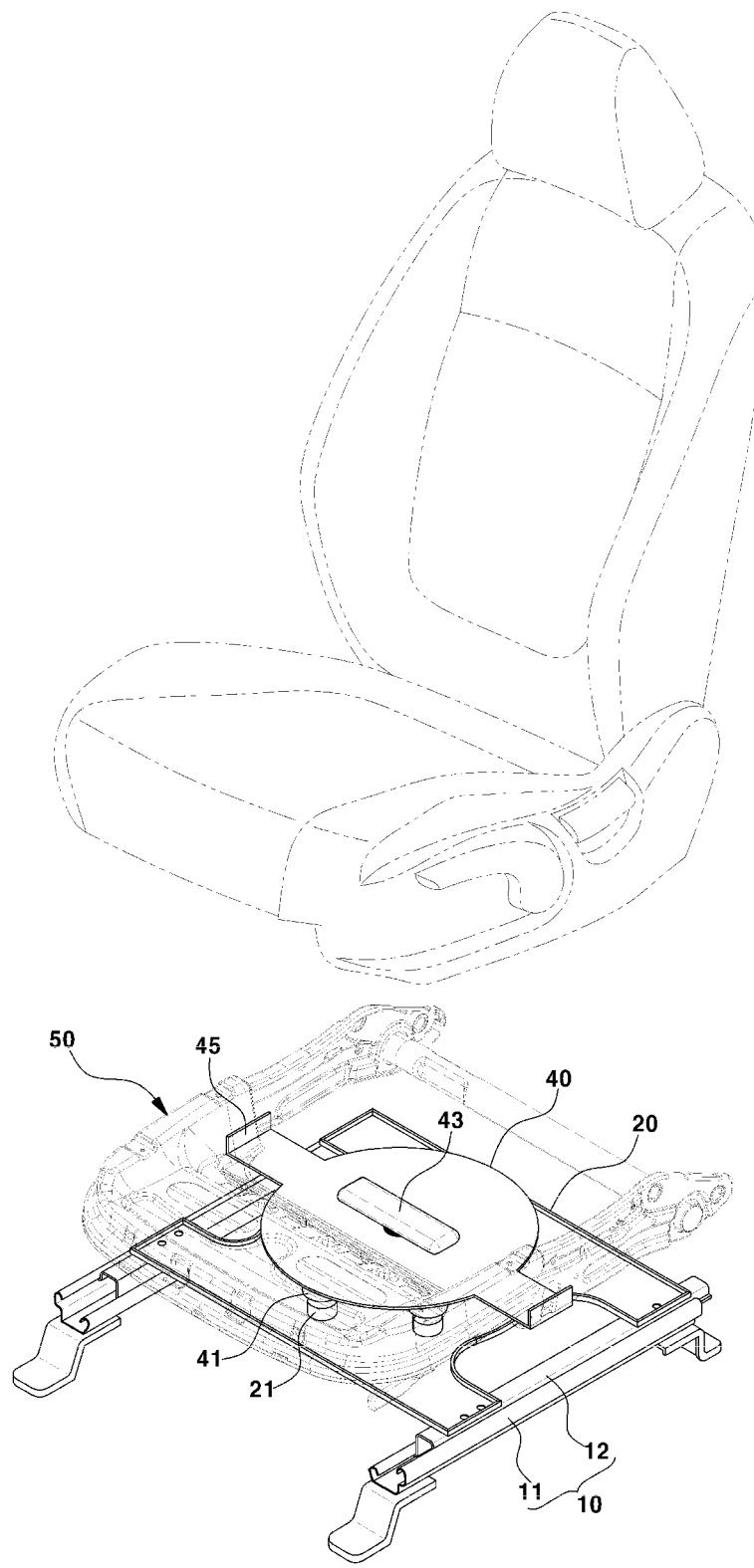

FIG. 1 is an exploded perspective view illustrating a swivel device for vehicle seats according to one form of the present disclosure, FIGS. 2 and 3 are perspective views respectively illustrating the lower portions of a swivel plate and an elevating plate of the swivel device for vehicle seats according to one form of the present disclosure, and FIGS. 4 to 6 are perspective views illustrating assembly of the swivel device for vehicle seats according to another form of the present disclosure in stages.

While a swivel device included in a conventional seat employs a mechanism which rotates the seat about an axis of rotation in a two-dimensional plane, the swivel device according to an exemplary form of the present disclosure employs a mechanism which employs a three-dimensional space acquired by adding a Z-axis in the vertical direction to a two-dimensional plane when a seat is rotated.

For this purpose, as shown in FIG. 1, the swivel device includes: a base plate 20 which is mounted on seat rails 10 mounted on a floor plate, a swivel plate 30 which is mounted on the base plate 20 so as to be rotatable, and an elevating plate 40 which is coupled to the swivel plate 30 so as to be raisable and lowerable and to be rotatable and is simultaneously mounted on a seat cushion frame 50.

The base plate 20 has a plate structure in which first locking members 21 protrude from the upper surface thereof and mount terminals 24 mounted on the seat rails 10 protrude from both side portions thereof.

For reference, each seat rail 10 includes a stationary rail 11 which is fixedly mounted on the floor panel, and a movable rail 12 which is coupled to the stationary rail 11 to be slidable forwards and backwards.

Thereby, the mount terminals 24 of the base plate 20 are mounted on the movable rails 12 of the seat rails 10, and the reason for this is to easily adjust the forward and backward sliding position of the seat.

Particularly, the first locking members 21 having a circular pin shape protrude upwards from the upper surface of the base plate 20 at positions deviating from the external diameter portion of the swivel plate 30.

More particularly, the first locking members 21, which are provided in a plural number, (for example, six first locking members 21) are disposed on the upper surface of the base plate 20 at the same interval in the circumferential direction.

Here, a second motor 23 to provide rotary force to the swivel plate 30 is mounted at a predetermined position of the lower surface of the base plate 20, and an output shaft of the second motor 23 protrudes upwards through a through hole 25 formed through the base plate 20 so that the second motor 23 is disposed so as to be rotatable.

The swivel plate 30 has a circular plate shape, and is disposed on the base plate 20 so as to be rotatable by driving of the second motor 23.

For this purpose, a pivot cover 26 having a pivot shaft 27 is mounted at the center of the base plate 20, and, as shown in FIG. 2, a pivot recess 31 into which the pivot shaft 27 of the pivot cover 26 is inserted is formed in the center of the lower surface of the swivel plate 30.

Therefore, the pivot shaft 27 of the pivot cover 26 is pivotably inserted into the pivot recess 31 of the swivel plate 30, and thereby, the swivel plate 30 is disposed on the base plate 20 so as to be rotatable.

In order to transmit the rotary force of the second motor 23 to the swivel plate 30, a rotary force transmission mechanism 60 is mounted on the output shaft of the second motor 23 and the lower surface of the swivel plate 30.

Particularly, the rotary force transmission mechanism 60 is configured to transmit the rotary force of the second motor 23 to the swivel plate 30 using a gear train.

For this purpose, the rotary force transmission mechanism 60 includes a driving gear 62 mounted on the output shaft of the second motor 23 to be rotated in place, and, as shown in FIG. 2, a driven gear 64 formed on the lower surface of the swivel plate 30 to be engaged with the driving gear 62.

Here, in order to prevent separation of the driving gear 62 mounted on the output shaft of the second motor 23 from the output shaft, it is desired to support the driving gear 62, and in order to prevent shaking of the swivel plate 30, it is desired to support the edge portion of the swivel plate 30.

For this purpose, an arc-shaped slot 32, into which a rotation shaft 63 of the driving gear 62 is inserted, is formed through the edge portion of the swivel plate 30, and a gear cover 61 having a diameter greater than the width of the arc-shaped slot 32 is adhered to the rotation shaft 63 of the driving gear 62, which is inserted into the arc-shaped slot 32 and protrudes upwards, so as to prevent separation of the driving gear 62.

Therefore, when the rotation shaft 63 of the driving gear 62 is inserted into the arc-shaped slot 32 of the swivel plate 30 and is coupled to the gear cover 61, the driving gear 62 may be easily rotated in place by driving of the second motor 23 and thus easily transmit rotary force to the driven gear 64 formed on the lower surface of the swivel plate 30.

Further, since the edge portion of the swivel plate 30 is supported by the rotation shaft 63 of the driving gear 62 inserted into the arc-shaped slot 32 and the gear cover 61, the swivel plate 30 may be easily rotated by the rotary force transmitted from the driving gear 62 to the driven gear 64 without shaking.

The elevating plate 40, which has a circular plate structure, is coupled to the swivel plate 30 so as to be raisable and lowerable and to be rotatable, and is simultaneously mounted on the seat cushion frame 50.

For this purpose, an internal screw hole 46 is formed through the center of the elevating plate 40, a first motor 43 is mounted on the upper surface of the elevating plate 40, and a lead screw 42 coupled to the internal screw hole 46 so as to be rotatable in place, is mounted on an output shaft of the first motor 43.

In one form, two or more guide pins 33 protrude upwards from the upper surface of the swivel plate 30, guide holes 44, into which the guide pins 33 are inserted, are formed through the elevating plate 40, and the upper ends of the guide pins 33, inserted into the guide holes 44, are connected to both side portions of the first motor 43.

Here, mount plates 45, which are mounted on the seat cushion frame 50, protrude from both side portions of the elevating plate 40.

As such, because the guide pins 33 of the swivel plate 30 are inserted into the guide holes 44 of the elevating plate 40 and the mount plates 45 of the elevating plate 40 are mounted on the seat cushion frame 50, the elevating plate 40 and the seat cushion frame 50 may be in a rotatable state when the swivel plate 30 is rotated.

In another form, second locking members 41, which are separably coupled to the first locking members 21, protrude downwards from the lower surface of the elevating plate 40, as shown in FIG. 3.

Particularly, the second locking members 41 having a cylindrical shape with a hollow formed therein protrude downwards from the lower surface of the elevating plate 40 at positions deviating from the external diameter portion of the swivel plate 30, so that the first locking members 21 are inserted into the second locking members 41.

More particularly, the second locking members 41, which are provided in a plural number, (for example, six second locking members 41 corresponding to the six first locking members 21) are disposed on the lower surface of the elevating plate 40 at the same interval in the circumferential direction.

Therefore, the elevating plate 40 is lowered and thus the first locking members 21 are inserted into the second locking members 41 to increase rigidity of the seat so that the seat is able to withstand a collision before and after swiveling the seat, and the elevating plate 40 is raised and thus the first locking members 21 are separated from the second locking members 41 and the seat is in a rotatable state during swiveling the seat.

Hereinafter, a process of operating the swivel device for vehicle seats having the above-described configuration according to the present disclosure will be described.

Figure 7:
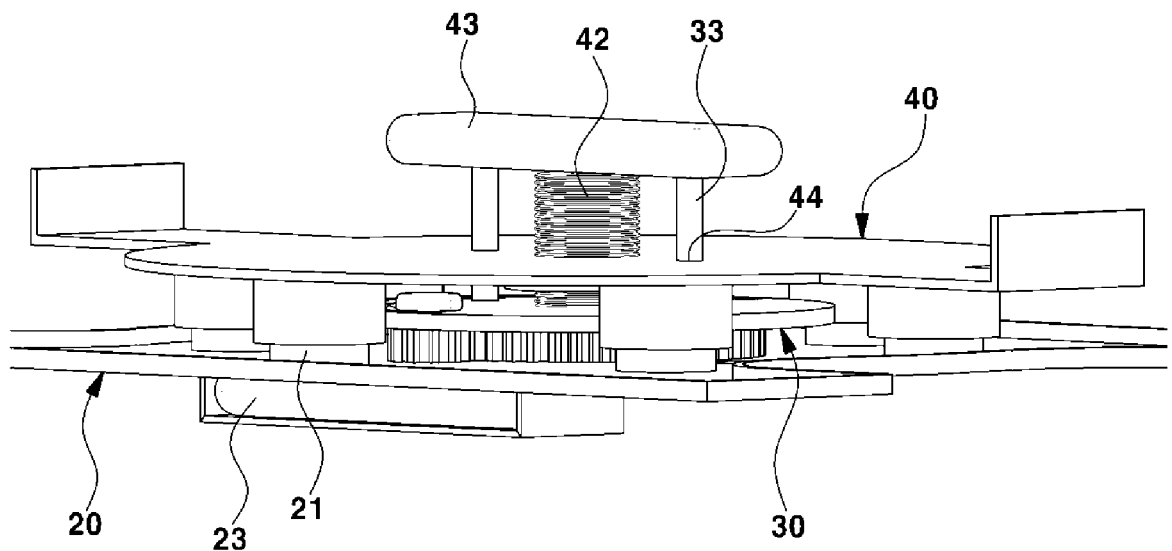
FIG. 7 is a perspective view illustrating the state of the elevating plate of the swivel device for vehicle seats according to one form of the present disclosure before raising.
Figure 9A:
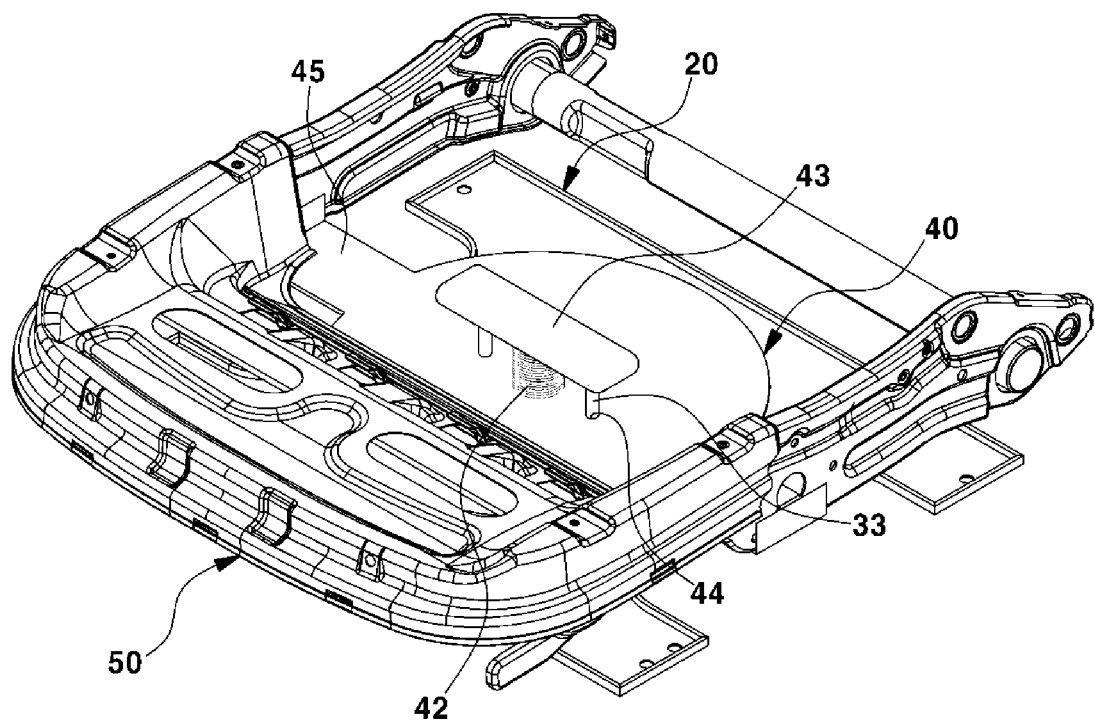
FIGS. 9A and 9B are perspective and side views illustrating the state of the swivel device for vehicle seats according to one form of the present disclosure before swiveling.
Figure 9B:
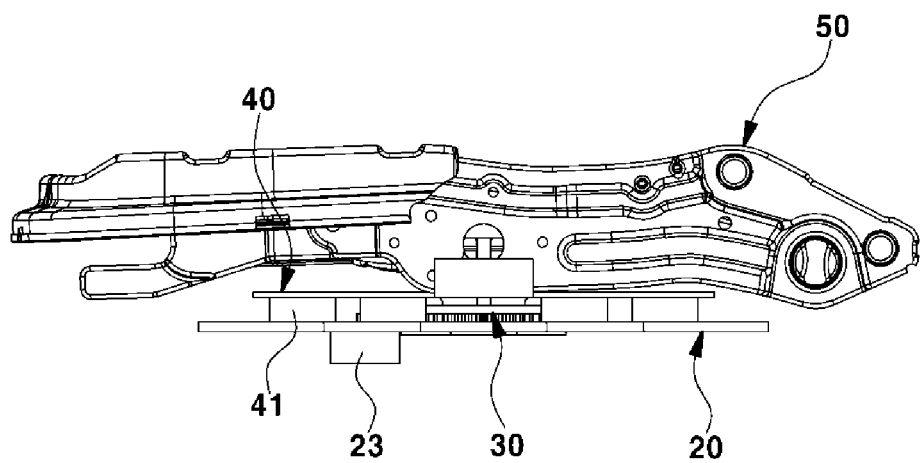

FIG. 7 is a perspective view illustrating the state of the elevating plate of the swivel device for vehicle seats according to one form of the present disclosure before raising, and FIGS. 9A and 9B are perspective and side views illustrating the state of the swivel device for vehicle seats according to another form of the present disclosure before swiveling.

Before swiveling the seat, the elevating plate 40 maintains the lowered state.

In this state, the first locking members 21 of the base plate 20 are inserted into the second locking members 41 of the elevating plate 40.

That is to say, since the first locking members 21 of the base plate 20 mounted on the seat rails 10 are inserted into and locked in the second locking members 41 of the elevating plate 40 mounted on the seat cushion frame 50, rigidity of the seat is increased so that the seat is able to withstand a collision.

Since a conventional swivel-type seat is rotated in a two-dimensional plane by a swivel mechanism without separate reinforcement of the center of rotation thereof, rigidity of the center of rotation of the swivel-type seat is poor, and thus, the swivel-type seat may fall to one side due to damage to the center or rotation thereof at the time of a collision accident. However, in the seat, to which the swivel device according to the present disclosure is applied, increase in rigidity is achieved by coupling between the first locking members 21 and the second locking members 41, and thus damage to the center of rotation of the seat at the time of a collision accident may be prevented and falling of the swivel-type seat to one side caused thereby may be prevented.

Figure 8:
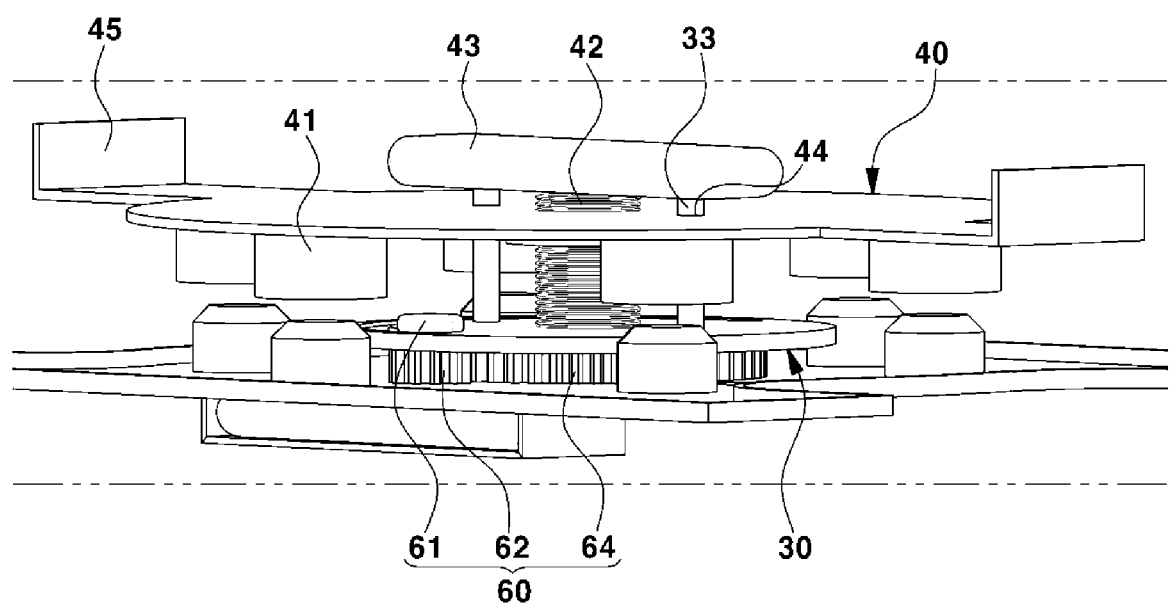
FIG. 8 is a perspective view illustrating the state of the elevating plate of the swivel device for vehicle seats according to one form of the present disclosure after raising.
Figure 10A:
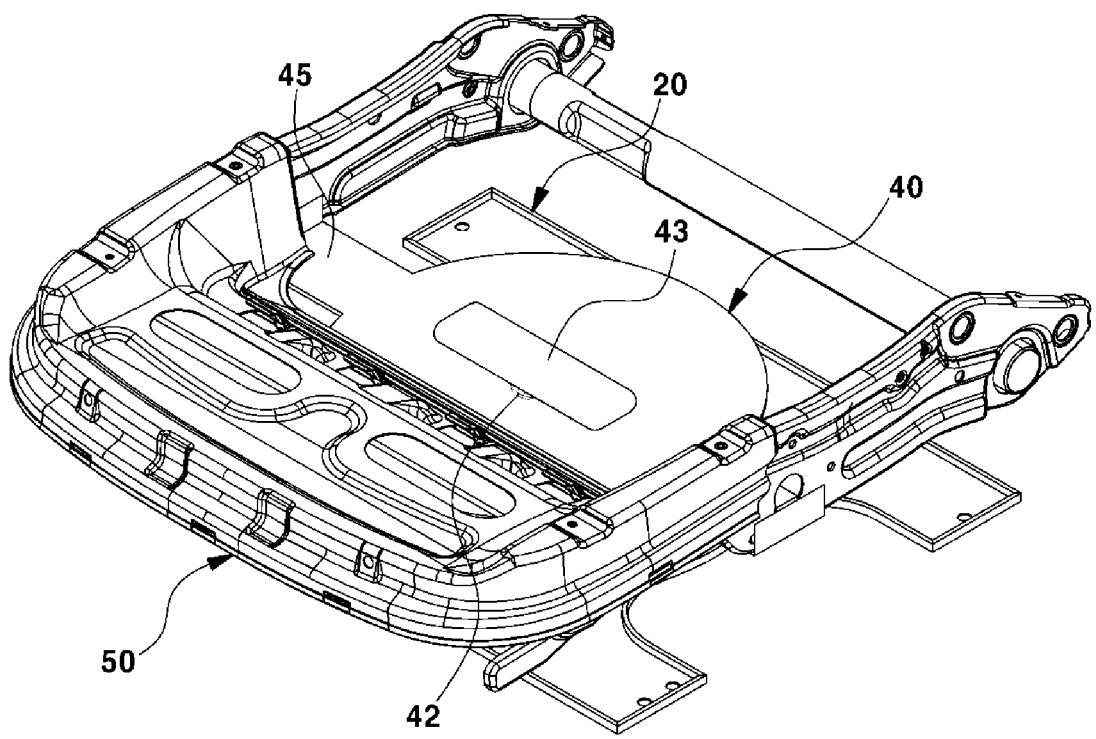
FIGS. 10A and 10B are perspective and side views illustrating the raised state of the elevating plate in order to swivel the swivel device for vehicle seats according to one form of the present disclosure.
Figure 10B:
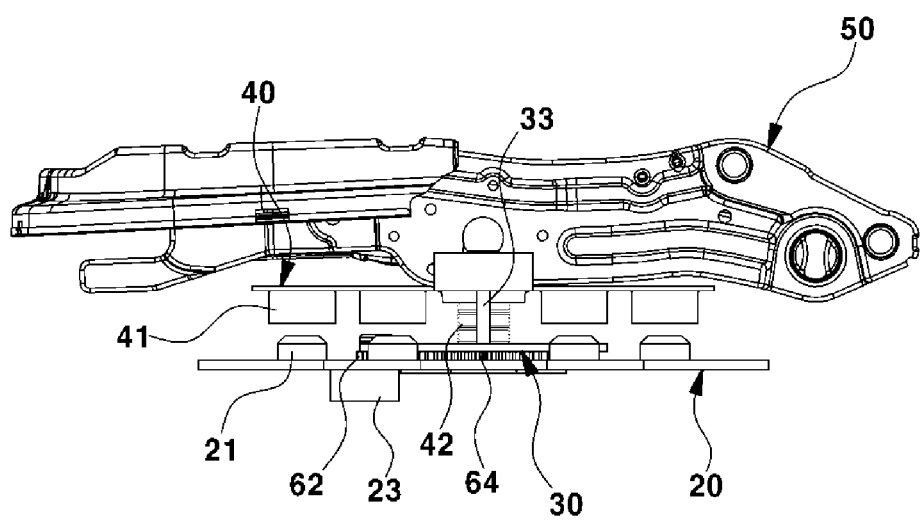

FIG. 8 is a perspective view illustrating the state of the elevating plate of the swivel device for vehicle seats according to one form of the present disclosure after raising, and FIGS. 10A and 10B are perspective and side views illustrating the raised state of the elevating plate in order to swivel the swivel device for vehicle seats according to another form of the present disclosure.

In order to perform swiveling of the seat, raising of the elevating plate 40 is performed first.

For this purpose, the first motor 43 mounted on the upper surface of the elevating plate 40 is driven and thus rotates the lead screw 42 in place in one direction.

Here, the lead screw 42 is in the state in which the lead screw 42 is coupled to the internal screw hole 46 formed through the center of the elevating plate 40, and the guide pins 33 of the swivel plate 30 are in the state in which the guide pins 33 pass through the guide holes 44 of the elevating plate 40.

Therefore, when the lead screw 42 is rotated in place in one direction, the elevating plate 40 having the internal screw hole 46 is raised, as shown in FIG. 8, and the seat cushion frame 50 on which the elevating plate 40 is mounted is also raised, as shown in FIGS. 10A and 10B.

Simultaneously, the second locking members 41 of the elevating plate 40 are also raised, and are thus separated from the first locking members 21 of the base plate 20, as shown in FIG. 8.

Therefore, as the second locking members 41 are separated from the first locking members 21, the elevating plate 40 and the seat cushion frame 50 are also rotatable during rotation of the swivel plate 30.

Figure 11A:
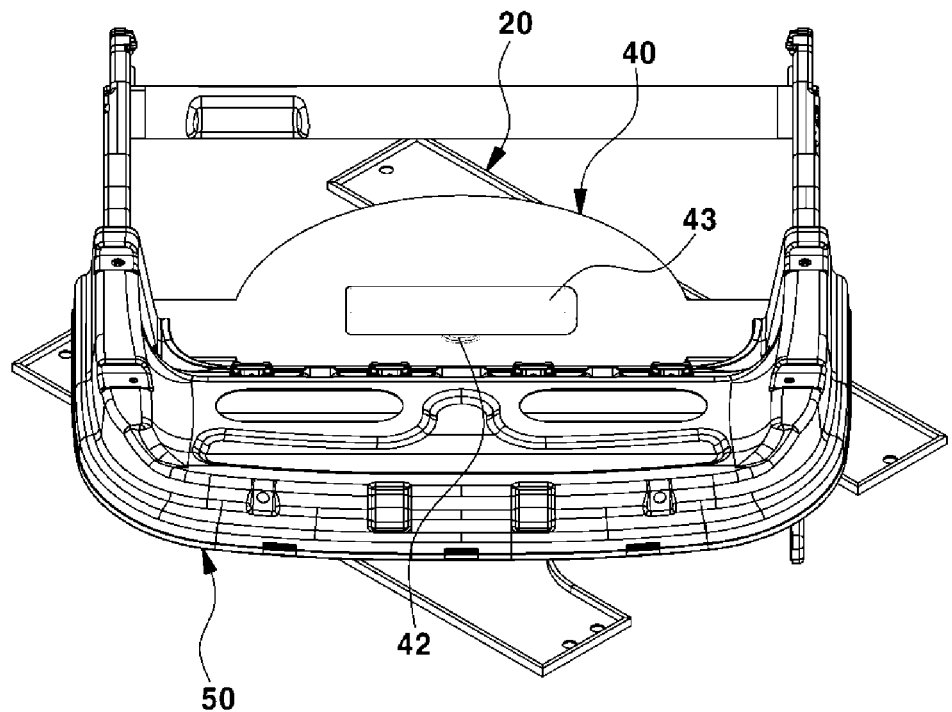
FIGS. 11A and 11B are perspective and side views illustrating the swiveling state of the swivel device for vehicle seats according to one form of the present disclosure.
Figure 11B:
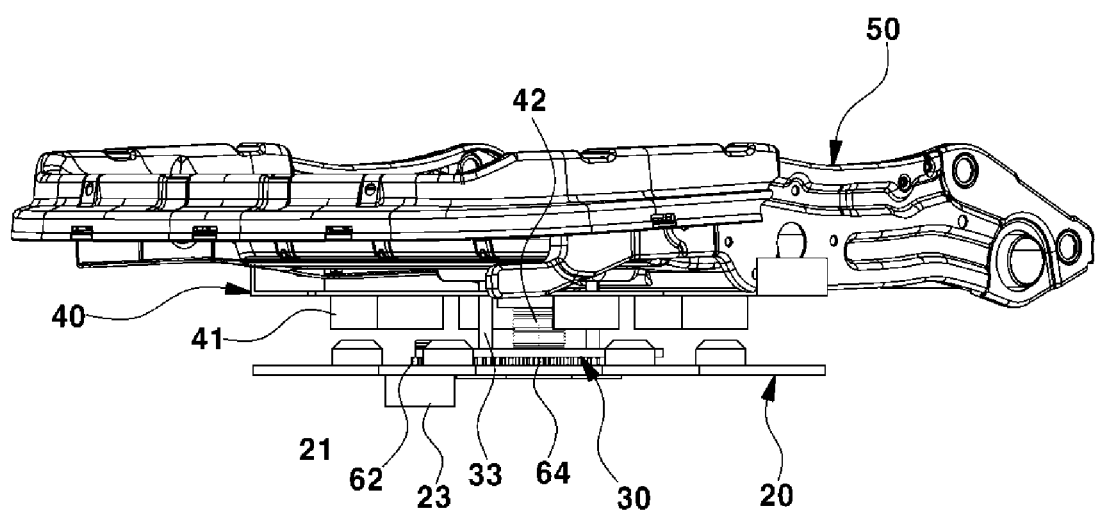

FIGS. 11A and 11B are perspective and side views illustrating the swiveling state of the swivel device for vehicle seats according to one form of the present disclosure, and FIGS. 12A and 12B are perspective and side views illustrating the swiveling-completed state of the swivel device for vehicle seats according to another form of the present disclosure.

After the elevating plate 40 is raised, swiveling of the seat is substantially performed.

For this purpose, the driving gear 62 is rotated in place in one direction by driving of the second motor 23 mounted on the lower surface of the base plate 20, and the rotary force of the driving gear 62 is transmitted to the driven gear 64 formed on the lower surface of the swivel plate 30 and thus rotates the swivel plate 30.

Simultaneously, the guide pins 33 of the swivel plate 30 pass through the guide holes 44 of the elevating plate 40, and thus, the rotary force of the swivel plate 30 is transmitted to the elevating plate 40.

Therefore, when the swivel plate 30 is rotated, the elevating plate 40 and the seat cushion frame 50 are rotated together with the swivel plate 30, as shown in FIGS. 11A and 11B, and in this case, the swivel plate 30, the elevating plate 40 and the seat cushion frame 50 are rotated up to 180°, as shown in FIGS. 12A and 12B.

FIGS. 13A and 13B are perspective and side views illustrating the lowered state of the elevating plate after swiveling of the swivel device for vehicle seats according to one form of the present disclosure has been completed.

When swiveling of the swivel device in which the seat is rotated at 180° through rotation of the elevating plate 40 and the seat cushion frame 50 together with the swivel plate 30 has been completed, the elevating plate 40 and the seat cushion frame 50 are lowered again.

For this purpose, the first motor 43 mounted on the upper surface of the elevating plate 40 is driven and thus rotates the lead screw 42 in place in the other direction.

Here, the lead screw 42 is in the state in which the lead screw 42 is coupled to the internal screw hole 46 formed through the center of the elevating plate 40, and the guide pins 33 of the swivel plate 30 are in the state in which the guide pins 33 pass through the guide holes 44 of the elevating plate 40.

Therefore, when the lead screw 42 is rotated in place in the other direction, the elevating plate 40 having the internal screw hole 46 is lowered, and the seat cushion frame 50 on which the elevating plate 40 is mounted is also lowered, as shown in FIGS. 13A and 13B.

Simultaneously, the second locking members 41 of the elevating plate 40 are lowered together with the elevating plate 40, and thus, the first locking members 21 are inserted into and locked in the second locking members 41 again, as shown in FIG. 13B, thereby increasing rigidity of the seat so as to be able to withstand a collision even after swiveling the seat.

As is apparent from the above description, a swivel device for vehicle seats according to the present disclosure may provide the following effects.

First, the swivel device for vehicle seats according to the present disclosure first raises a seat in the upward direction and then rotates the seat, thereby easily performing swiveling of the seat using a three-dimensional space.

Second, the swivel device for vehicle seats according to the present disclosure lowers the seat to an original position thereof after swiveling the seat, and then firmly fixes the seat using locking members, thereby achieving increase in rigidity of the seat so as to be able to withstand a collision.

The present disclosure has been described in detail with reference to the exemplary forms as discussed above. However, it will be appreciated by those skilled in the art that changes may be made in these forms without departing from the principles and spirit of the present disclosure, the scope of which is defined in the appended claims and their equivalents.

What is claimed is:

1. A swivel device for vehicle seats, comprising:
a base plate provided with a plurality of first locking members formed on an upper surface thereof, and mounted on seat rails mounted on a floor panel;
a lower motor mounted on a lower surface of the base plate;
a swivel plate disposed on the base plate and configured to be rotated by the lower motor;
a rotary force transmission mechanism mounted on an output shaft of the lower motor and the swivel plate and configured to transmit a rotary force of the lower motor to the swivel plate;
an elevating plate provided with a plurality of second locking members, the plurality of second locking members separably coupled to the plurality of first locking members and formed on a lower surface of the elevating plate, wherein an internal screw hole is formed through a center of the elevating plate, and the elevating plate is fixedly mounted on a seat cushion frame and simultaneously coupled to the swivel plate so as to be raised or lowered and rotated;
a lead screw inserted into the internal screw hole and configured to rotate in place; and
an upper motor mounted on an upper surface of the elevating plate and configured to transmit a rotary force to the lead screw.

2. The swivel device of claim 1, wherein:
first locking members of the plurality of first locking members have a circular pin shape and protrude upwards from the upper surface of the base plate, and
second locking members of the plurality of second locking members have a cylindrical shape with a hollow formed therein and protrude downwards from the lower surface of the elevating plate, so that the first locking members are inserted into corresponding second locking members of the plurality of second locking members.

3. The swivel device of claim 2, wherein:
the first locking members of the plurality of first locking members are disposed on the upper surface of the base plate at predetermined intervals in a circumferential direction, and
the second locking members of the plurality of second locking members are disposed on the lower surface of the elevating plate at predetermined intervals in the circumferential direction.

4. The swivel device of claim 1, wherein:
a pivot cover having a pivot shaft is mounted at a center of the base plate, and
a pivot recess into which the pivot shaft of the pivot cover is inserted is formed in a center of a lower surface of the swivel plate.

5. The swivel device of claim 1, wherein the rotary force transmission mechanism comprises:
a driving gear mounted on the output shaft of the lower motor configured to pass through a through hole formed through the base plate; and
a driven gear formed on a lower surface of the swivel plate so as to be engaged with the driving gear.

6. The swivel device of claim 5, wherein an arc-shaped slot configured to receive a rotation shaft of the driving gear is formed through an edge portion of the swivel plate.

7. The swivel device of claim 6, wherein a gear cover having a diameter greater than a width of the arc-shaped slot is adhered to the rotation shaft of the driving gear inserted into the arc-shaped slot so as to prevent separation of the driving gear.

8. The swivel device of claim 1, wherein at least two guide pins protrude upwards from an upper surface of the swivel plate, and guide holes configured to receive the at least two guide pins are formed through the elevating plate.

9. The swivel device of claim 1, wherein mount terminals mounted on movable rails of the seat rails protrude from both side portions of the base plate.

10. The swivel device of claim 1, wherein mount plates mounted on the seat cushion frame protrude from both side portions of the elevating plate.

* * * * *